United States Patent
Bergey

(10) Patent No.: US 12,270,282 B2
(45) Date of Patent: Apr. 8, 2025

(54) METHOD FOR DETERMINING LOCATIONS OF WELLS IN A FIELD

(71) Applicant: TotalEnergies OneTech, Courbevoie (FR)

(72) Inventor: Pierre Bergey, Saint Germain en Laye (FR)

(73) Assignee: TotalEnergies OneTech, Courbevoie (FR)

( * ) Notice: Subject to any disclaimer, the term of this patent is extended or adjusted under 35 U.S.C. 154(b) by 373 days.

(21) Appl. No.: 17/637,411

(22) PCT Filed: Aug. 23, 2019

(86) PCT No.: PCT/IB2019/000954
§ 371 (c)(1),
(2) Date: Feb. 22, 2022

(87) PCT Pub. No.: WO2021/038261
PCT Pub. Date: Mar. 4, 2021

(65) Prior Publication Data
US 2022/0282595 A1   Sep. 8, 2022

(51) Int. Cl.
*E21B 41/00*         (2006.01)
*G01V 20/00*         (2024.01)

(52) U.S. Cl.
CPC ............... *E21B 41/00* (2013.01); *G01V 20/00* (2024.01); *E21B 2200/20* (2020.05)

(58) Field of Classification Search
CPC .. E21B 41/00; E21B 2200/20; E21B 2200/22; G01V 20/00
See application file for complete search history.

(56) References Cited

U.S. PATENT DOCUMENTS

| | | | |
|---|---|---|---|
| 2007/0027666 A1* | 2/2007 | Frankel | E21B 49/00 703/10 |
| 2010/0088076 A1* | 4/2010 | Koutsabeloulis | E21B 43/00 703/2 |
| 2017/0364795 A1* | 12/2017 | Anderson | G06N 20/10 |

OTHER PUBLICATIONS

Multi-objective optimization for rapid and robust optimal oilfield development under geological uncertainty, Yuqing Chang et al., Comput Geosci (2015) 19:933-950; Springer International Publishing Switzerland 2015, Published: Jun. 25, 2015. (Year: 2015).*

(Continued)

*Primary Examiner* — Catherine T. Rastovski
*Assistant Examiner* — Lal C Mang
(74) *Attorney, Agent, or Firm* — Seed IP Law Group LLP

(57) ABSTRACT

The present invention relates to a method for determining locations of wells in a field containing a hydrocarbon reservoir, said method comprising: •receiving a first set of geological gridded models; •receiving a set of criteria for positioning wells; •receiving a plurality of reference well patterns associated to the first set of geological gridded models; •estimating a plurality of weights, each weight being associated to a respective criterion among the plurality of criteria, based on the plurality of reference well patterns and the received set of criteria; •receiving a second geological gridded model of the field; and •determining locations of wells in the second geological gridded model based on the received set of criteria and the plurality of estimated weights.

10 Claims, 8 Drawing Sheets

(56) References Cited

OTHER PUBLICATIONS

NPL 1 continued: https://link.springer.com/article/10.1007/s10596-015-9507-6 (Year: 2015).*

The development of a novel multi-objective optimization framework for non-vertical well placement based on a modified non-dominated sorting genetic algorithm-II, Rostamian Auref, Computational Geosciences (2019) 23:1065-1085, Springer Nature Switzerland AG, Aug. 2, 2019. (Year: 2019).*

NPL 2 continued: https://link.springer.com/article/10.1007/s10596-019-09863-2 (Year: 2019).*

Bergey, "Defining 3D Reservoir Well Patterns As Functions Of Geology For Robust Design And Faster Optimization," EAGE/TNO Workshop—Olympus Field Development Optimization, Sep. 2018, 10 pages.

Chang et al., "Multi-objective optimization for rapid and robust optimal oilfield development under geological uncertainty," *Comput Geosci* 19:933-950, 2015.

Sethian, "A fast marching level set method for monotonically advancing fronts," *Proc. Natl. Acad. Sci. USA* 93:1591-1595, Feb. 1996.

Tsitsiklis, "Efficient Algorithms for Globally Optimal Trajectories," *IEEE Transactions on Automatic Control* 40(9):1528-1538, Sep. 1995.

* cited by examiner

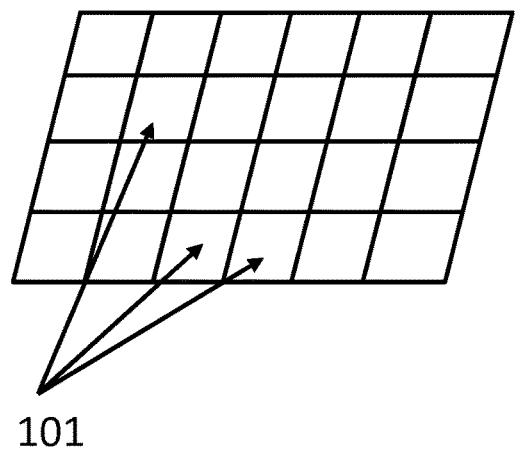
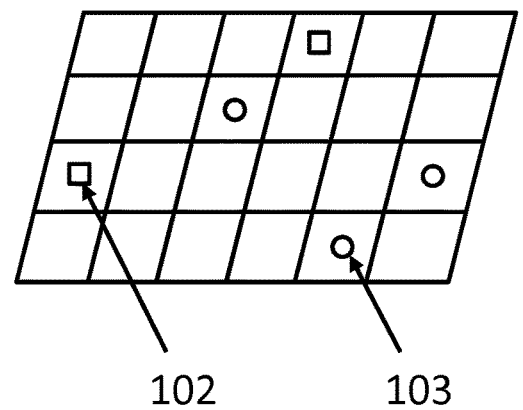
FIG. 1a
FIG. 1b
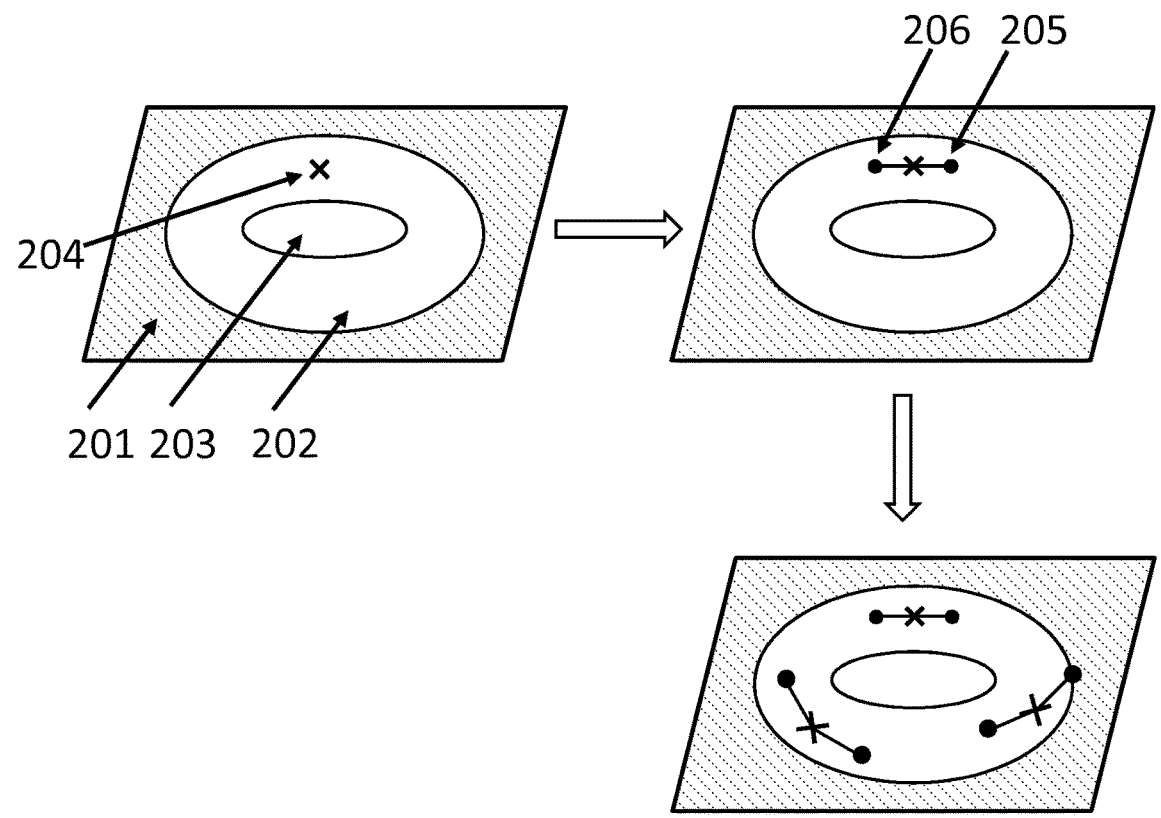
FIG. 2a

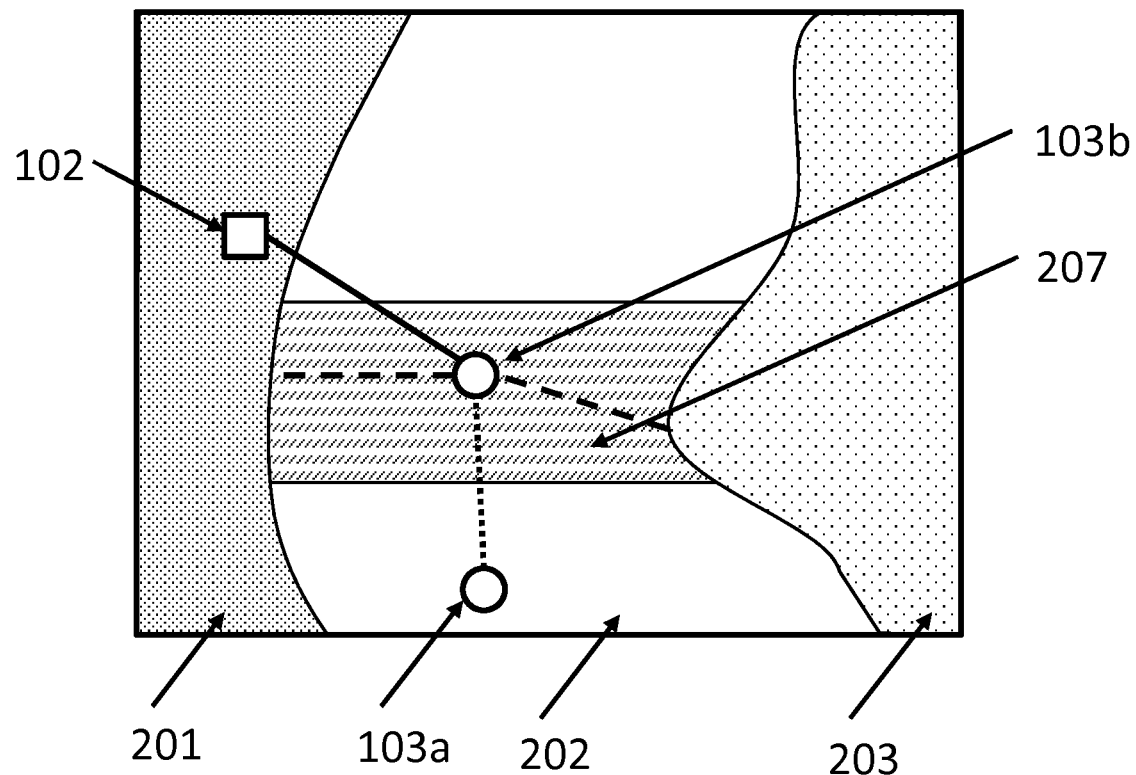
FIG. 2b
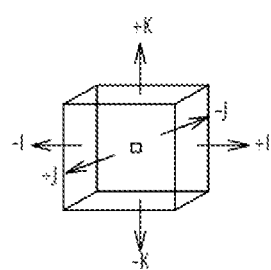 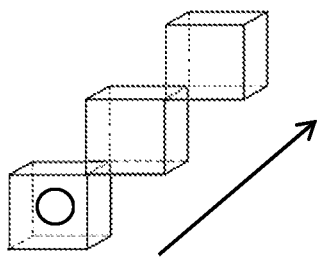 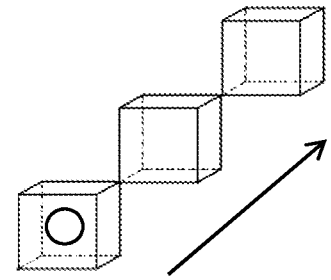
FIG. 3a  FIG. 3b  FIG. 3c

METHOD FOR DETERMINING LOCATIONS OF WELLS IN A FIELD

BACKGROUND OF THE INVENTION

The present invention relates to the determination of locations of wells in a field, and more specifically in a field containing a hydrocarbon reservoir.

The present invention may also be applied in the design of carbon dioxide injection wells in carbon dioxide sequestration applications or in the design of water injection wells in hydrogeological applications. More generally, the method may apply to any application in which one or more fluids are injected into or produced from a field in the subsoil.

The positioning of wells is a critical task in the production of a field containing a hydrocarbon reservoir. Indeed, the respective positions of producer wells and/or injector wells may greatly affect the productivity of the field and the volume of hydrocarbon recovered, and hence its profitability.

The reservoir generally contains at least a first fluid to be produced, and potentially other auxiliary fluids to be produced along with the first fluid. A third fluid and/or a fourth fluid are advantageously used to be injected in the reservoir to drive the production of the first and/or of the second fluid.

For example, the first fluid is oil and/or gas, the second fluid being gas and/or oil. The third fluid and/or fourth fluid are generally water, gas, and/or oil. The first fluid and the second fluid are preferentially hydrocarbons.

The reservoir may comprise several regions, for example at least an aquifer, an oil leg, and a gas cap. An aquifer is generally delimited upwards by a water oil contact or "WOC". An oil leg is delimited between a water oil contact and a gas oil contact or "GOC". The gas cap is located above the gas oil contact.

By "producer well", it is meant a well in which a desired fluid, i.e. the first fluid and/or the second fluid, is produced. Hence, producer wells aim at the extraction of the desired fluid.

By "injector well", it is meant a well in which fluids, i.e. the third fluid and/or the fourth fluid, are injected rather than produced. Injector wells aim at maintaining reservoir pressure and substituting one fluid by another in the reservoir thus enhancing the production of the desired fluid at the producer wells.

Usually, a numerical gridded model of the field is generated to determine the properties of the reservoir contained in the field, including geology, infrastructure, and fluid properties.

Based on this model and on raw field data, a team of scientists (e.g. composed of reservoir engineers and/or reservoir geologists) usually determines the best potential locations for wells (producers and/or injectors), based on experience, taking into account the constraints which exist in the field, such as distance to surface well head clusters or platforms. Key design parameters include spacing between wells, well drain length and well configurations. In the following, the determined set of locations for wells may be referred to as "well pattern".

However, such process is time consuming and requires significant human effort and skill.

Software products have been developed to help positioning wells relative to the reservoir. These software products are typically based on computing geographic coordinates of the wells. Each well to be positioned is usually defined by a set of coordinates for each end of the well drain (i.e the fraction of the well length where flow occurs between the reservoir and the wellbore). Therefore, in case of a set of three coordinates, the software must optimize at least six parameters per well. For a set of fifteen wells, the number of parameters raises to ninety, which becomes costly and lengthwise to solve, if possible.

There is thus a need for a method for determining well locations in a field which does not require too much human or computational resources and which gives reliable results for improving productivity.

SUMMARY OF THE INVENTION

The invention relates to a method implemented by computer means for determining locations of wells in a field containing a hydrocarbon reservoir, said method comprising:

/a/ receiving a first set of geological gridded models, each gridded model among the first set of geological gridded models comprising a respective plurality of cells;

/b/ receiving a set of criteria for positioning wells in a geological gridded model;

/c/ receiving a plurality of reference well patterns, each reference well pattern among the plurality of reference well patterns comprising a respective plurality of reference locations of wells in a respective geological gridded model among the first set of geological gridded models;

/d/ for each geological gridded model among the first set of geological gridded models:

/d1/ for a number of iterations equal to a number of wells in the reference well pattern respectively associated to the geological gridded model:

determining a group of cells among the respective plurality of cells of said geological gridded model;

for each cell among said group of cells, computing criterion measures, each criterion measure representing a suitability to a respective criterion among the received set of criteria;

determining, based on said criterion measures, a set of non-dominated cells among said group of cells via a non-dominated sorting algorithm for jointly optimizing the set of criteria;

determining a first cell among the set of non-dominated cells, said first cell minimizing a distance between the reference locations of the reference well pattern respectively associated to the geological gridded model and the set of non-dominated cells;

determining a plurality of intermediate weights based on coordinates of the first cell in a space defined by the set of criterion measures, each intermediate weight being associated to a respective criterion among the plurality of criteria;

/e/ estimating a plurality of weights, each weight being associated to a respective criterion among the plurality of criteria and estimated based on intermediate weights among the pluralities of intermediate weights associated to said respective criterion;

/f/ receiving a second geological gridded model of the field, said second geological gridded model comprising a respective plurality of cells;

/g/ determining locations of wells in the second geological gridded model based on the received set of criteria and the plurality of estimated weights.

It is noted that a "set" of elements may refer to one or more than one elements.

The "set of criteria" correspond to a set of constraints for placing a well at a location corresponding to a cell of the gridded model. Indeed, the fact that a cell is a good candidate to position a well at this location depends on the fluidic properties of this cell. Therefore, the expert (geologist or reservoir engineer) generally positions a well at a cell according to a set of criteria that must be defined in order to automate the positioning method. The criteria may depend on the type of well (e.g. injector/producer), the part of the well (e.g. center/toe/heel) and/or the type of fluid.

By "well pattern" it is meant a set of locations of wells in a geological gridded model.

By "reference well pattern" it is meant a well pattern received (i.e. not obtained by applying the method of determination of well locations) and used for estimating some parameters. For instance, a reference well pattern may be determined by an expert. By estimating parameters from reference well patterns, it is then possible to obtain automatically new well patterns built according to a "logic of construction" similar to that used to build the reference well patterns.

The above method may also be applied for positioning well parts (e.g. center/toe/heel of a well).

The "group of cells" may comprise all cells of the geological gridded model, or only a subset of cells among the plurality of cells of the geological gridded model.

By "criterion measure", it is meant a measure associated to a criterion, which quantifies the adequacy of a given cell to this criterion. For instance, if the criterion is related to a distance to a given fluid (e.g. oil, water, gas), the respective criterion measure may be a mathematical distance or any measurement relative to a distance (e.g. a Time of Flight).

As mentioned above, the positioning of a well is subject to a set of criteria and therefore corresponds to a joint optimization problem. However, it is generally not possible to find a cell/a set of cells that optimizes all the criteria. Therefore, an appropriate solution consists in using a non-dominated sorting algorithm, e.g. based on the Pareto dominance principle. Such algorithm eliminates cells that are "worse" than others, the remaining cells being called "non-dominated cells".

The "distance between the reference locations of the reference well pattern respectively associated to the geological gridded model and the set of non-dominated cells" may be any mathematical tool characterizing a proximity between the two groups of cells, for instance a Hausdorff distance.

Each criterion is associated to a respective weight which reflects the importance that the expert gave to the criterion when constructing the reference well patterns. These weights are estimated to be used to build new well patterns, according to a similar construction logic.

By "intermediate weight", it is meant a quantity determined as a calculation intermediate to estimate a weight associated with a criterion.

The above method advantageously makes it possible to determine locations of wells in a field completely automatically, from reference data (or "training data")—the reference well pattern(s).

In one or several embodiments, step /d/ lay comprise:
  determining a plurality of intermediate weights $w_i^{k,j}$ corresponding to a weight $w_i$ associated to a criterion $C_i$ among the plurality of criteria, k being an integer between 1 and a number of reference well patterns and j being an integer between 1 and the number of wells in the reference well pattern respectively associated to the geological gridded model;

and step /e/ may comprise:
  estimating the weight $w_i$ as a function of intermediate weights $w_i^{k,j}$ among the plurality of intermediate weights.

For instance, the function of intermediate weights $w_i^{k,j}$ may be a mean of the intermediate weights $w_i^{k,j}$.

In one or several embodiments, in step /d1/, the determining of the group of cells may comprise:
  receiving a first set of location constraints depending on a type of well;
wherein said group of cells includes cells that satisfy said first set of location constraints.

In such embodiments, the criterion measures are calculated only for a group of cells (and not for all cells of the gridded model) determined based on a first set of location constraints that coarsely defines areas where the current well shall not be positioned and/or areas where the current well has to be positioned (for instance, a water injector shall be positioned in the water leg region). This makes it possible to reduce the size of the space to be explored and thus to reduce the volume of data to be processed The determining /g/ of the locations of wells in the second geological gridded model may comprise:
  /g1/ for a number of iteration equal to a number of wells to be positioned in the second geological gridded model:
    determining a second group of cells among the respective plurality of cells of said second geological gridded model;
    for each cell among said second group of cells, computing criterion measures, each criterion measure representing a suitability to a respective criterion among the received set of criteria;
    determining, based on said criterion measures, a second set of non-dominated cells among said group of cells via a non-dominated sorting algorithm for jointly optimizing the set of criteria;
    determining a location for said well, based on said second set of non-dominated cells and on the plurality of weights estimated.

For instance, in /g1/, the determining of the second group of cells may comprise:
  receiving a second set of location constraints depending on a type of well;
wherein said second group of cells includes cells that satisfy said second set of location constraints.

It is noted that the second set of location constraints may be the same of the first set of location constraints, or it may be different.

In one or several embodiments, in /g1/, the determining of the location for said well may comprise:
  determining N points in the space defined by the set of criterion measures, wherein N is an integer, via a random sampling from a multidimensional distribution of the plurality of weights estimated;
  determining, among the second set of non-dominated cells, a cell which minimizes a predefined proximity criterion to the N points determined;
  selecting said cell as being the location for said well.

The random sampling may be performed by any adapted statistical method, for instance via Latin hypercube sampling.

By "proximity criterion" it is meant any mathematical tool for quantifying a proximity to a point/set of points. The proximity criterion may be a mathematical distance, but other tools may be used (e.g. a proximity in terms of angles with respect to a given axis).

For instance, the criterion measures may comprise at least one distance measure among:
- a distance to another cell or group of cells having at least an undesired property;
- a distance to another cell or group of cells corresponding to a well or a well of a same type that the well being positioned; and
- a distance to another cell or group of cells corresponding to a well or a well of a different type that the well being positioned.

These distances may be, for instance, Time of Flight measurements.

Alternatively or in addition, the criterion measures may comprise at least one flow measure among:
- a regional quantity of fluid available to flow; and
- a regional ability for a given fluid to flow.

Another aspect of the invention relates to a non-transitory computer readable storage medium, having stored thereon a computer program comprising program instructions, the computer program being loadable into a data-processing unit and adapted to cause the data-processing unit to carry out the steps of the above method when the computer program is run by the data-processing device.

Yet another aspect of the invention relates to a device for determining locations of wells in a field containing a hydrocarbon reservoir. The device may comprise a processor for:

/a/ receiving a first set of geological gridded models, each gridded model among the first set of geological gridded models comprising a respective plurality of cells;

/b/ receiving a set of criteria for positioning wells in a geological gridded model;

/c/ receiving a plurality of reference well patterns, each reference well pattern among the plurality of reference well patterns comprising a respective plurality of reference locations of wells in a respective geological gridded model among the first set of geological gridded models;

/d/ for each geological gridded model among the first set of geological gridded models:

/d1/ for a number of iterations equal to a number of wells in the reference well pattern respectively associated to the geological gridded model:
- determining a group of cells among the respective plurality of cells of said geological gridded model;
- for each cell among said group of cells, computing criterion measures, each criterion measure representing a suitability to a respective criterion among the received set of criteria;
- determining, based on said criterion measures, a set of non-dominated cells among said group of cells via a non-dominated sorting algorithm for jointly optimizing the set of criteria;
- determining a first cell among the set of non-dominated cells, said first cell minimizing a distance between the reference locations of the reference well pattern respectively associated to the geological gridded model and the set of non-dominated cells;
- determining a plurality of intermediate weights based on coordinates of the first cell in a space defined by the set of criterion measures, each intermediate weight being associated to a respective criterion among the plurality of criteria;

/e/ estimating a plurality of weights, each weight being associated to a respective criterion among the plurality of criteria and estimated based on intermediate weights among the pluralities of intermediate weights associated to said respective criterion;

/f/ receiving a second geological gridded model of the field, said second geological gridded model comprising a respective plurality of cells;

/g/ determining locations of wells in the second geological gridded model based on the received set of criteria and the plurality of estimated weights.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which:

FIG. 1a is a representation of a gridded model of a field containing a reservoir in a possible embodiment;

FIG. 1b is a representation of a well pattern in a possible embodiment;

FIG. 2a represents a well positioning sequence in a possible embodiment;

FIG. 2b represents a set of constraints for positioning a well in a possible embodiment;

FIGS. 3a, 3b, 3c are embodiments of a fluid property calculation;

DESCRIPTION OF PREFERRED EMBODIMENTS

Figure 4:
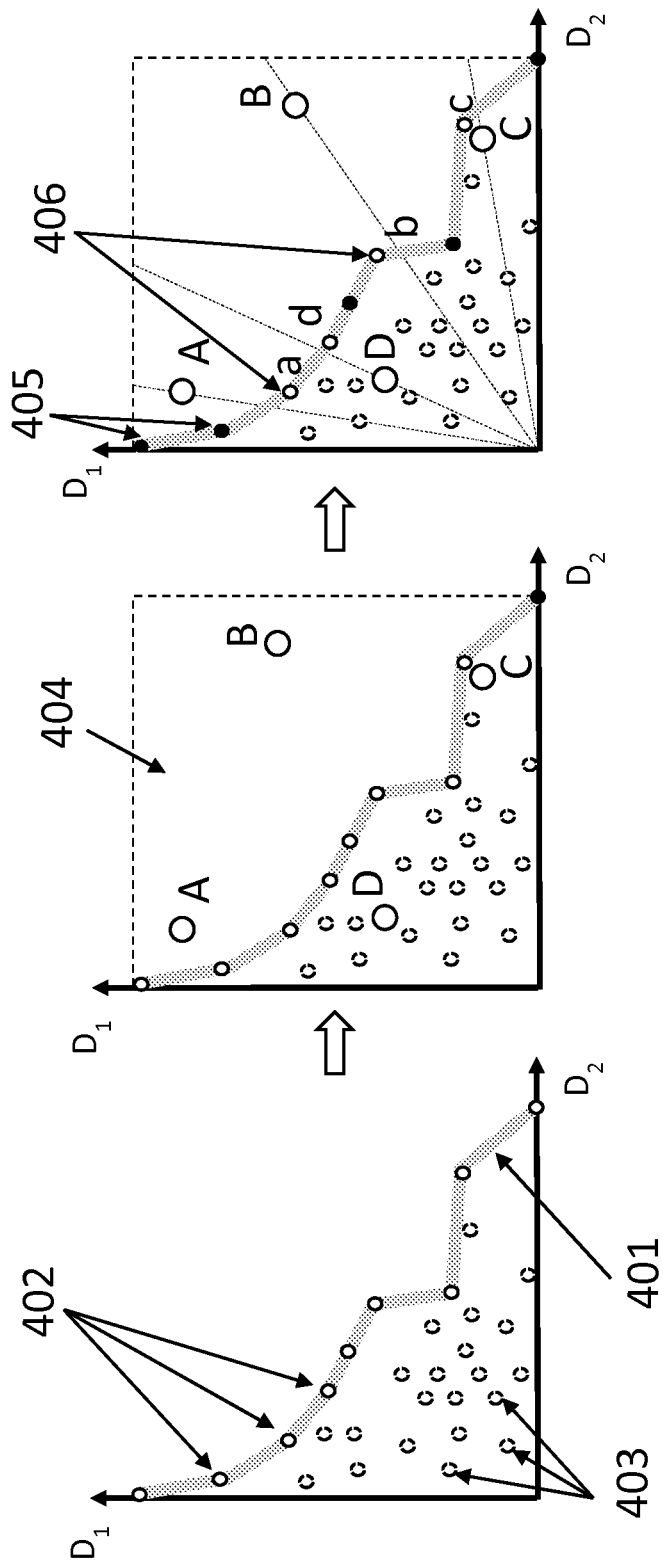
FIG. 4 represents a selection of cells for positioning a new well in a possible embodiment.

FIG. 1a is a representation of a gridded model of a field containing a reservoir in a possible embodiment of the invention.

The field may be numerically modeled using a two-dimensional (2D) or three-dimensional (3D) gridded model comprising a plurality of adjacent cells 101. Each cell 101 has a specific geographical position in the model, defined by geographical coordinates. Furthermore, each cell 101 has a shape and an area in the case of a 2D gridded model, or a volume in the case of a 3D gridded model. For instance, the model may comprise more than 1000 cells 101, and generally between 100 0000 cells and 5 000 000 cells.

Each cell 101 may be associated with cell infilling properties, which characterize the content of the cell 101, as well as the properties of the fluid contained in the cell 101 when applicable.

In one embodiment, the cell properties may be chosen among: the net to gross NTG (i.e. the ratio between the fraction of the rock in which the fluid is able to flow under typical/given flow conditions, and the fraction of the rock in which the fluid is unable to flow at significant rates under typical/given flow conditions); the porosity Φ; the total compressibility Ct; the initial saturation in the considered fluid phase Si; the minimum saturation Sm in the considered phase during reservoir flow; the permeability K defined as a XYZ tensor property, wherein the component of K in each direction i=X,Y,Z is noted Ki; a relative permeability Kr at or behind front for a given injection phase which is also defined as a XYZ tensor property, wherein Krg designates a relative permeability to gas, Krw designates a relative permeability to water and Krwg designates a relative permeability to co-injection of water and gas.

In one or several embodiments, the fluid properties of each cell 101 may advantageously be defined by at least one cell infilling property representative of a fluid density and by at least one cell infilling property representative of an ability of a fluid to flow.

For instance, a cell infilling property may be a diffusive pressure propagation slowness Slow, which can be considered on an anisotropic (XYZ tensor) or on an isotropic basis. Another cell infilling property may be a movable accumulation indicator, which can be defined for the fluid targeted for production or for the fluid targeted for injection. Another cell infilling property may be the volume weight mean transmissibility in the three-direction, which the ability of a particular fluid to flow in or out of the wells or on/into/towards neighboring wells. Other infilling properties may be used.

Furthermore, for two adjacent cells 101, inter-cell properties may be defined by a transmissibility between cells 101.

In one or several embodiment, the gridded model may be obtained based on simulation performed in a commercial reservoir modeling simulator such as ECLIPSE or IX (INTERSECT) from Schlumberger, STARS and IMEX from CMG, or any similar simulator.

FIG. 1b is a representation of a well pattern in a possible embodiment of the invention.

The wells 102, 103 to be positioned in the field may be producer wells 103 (represented by circles in FIG. 1b) and/or injector wells 102 (represented by squares in FIG. 1b).

As mentioned above, producer wells 103 aim at extracting a desired fluid, for instance oil and/or gas, and injector wells 102 aim at injecting an injection fluid, for instance water, to enhance the production of the desired fluid at the producer wells 103.

Each well 102, 103 to be positioned in the field may be associated to a type (injector 102 or producer 103) which reflects the flow direction, and to a type of fluid (oil, water, gas, etc.) preferentially targeted by the well 102, 103. By "preferentially targeted", it is meant that the well may be associated to several fluids, but one of them is more interesting than the others. For instance, an oil producer well always produces both oil and gas; even if oil and gas can have both positive economic values, it is necessary to distinguish wells intended primarily for oil production and those intended primarily for gas production.

FIG. 2a represents a well positioning sequence in a possible embodiment. In the example of FIG. 2a, the reservoir comprises different geological zones 201, 202, 203. For instance, zone 203 may represent the gas cap of the reservoir (i.e. the overlying gas zone), zone 202 may represent the oil leg (i.e. the underlying oil column) and zone 201 may represent the water leg (e.g. connate water). Of course, there may be a different number of zones, and the zones may be different from the examples given above.

Each well 102, 103 may be defined by at least one well location cell which is referred to as a "well insertion point" 204.

Advantageously, each well 102, 103 may be associated to a well drain, which is the part of a well which is producing from or injecting into the reservoir. The well drain may correspond to a series of adjacent cells 101 in which flow between the reservoir and the well occurs.

For instance, a well drain may be defined by a well insertion point 204 and a predefined drain length, such as a maximum drain length or a half drain length.

In one or several embodiments, the well 102, 103 may be defined in the model by a linear segment.

In the example represented in FIG. 2a, the well insertion point 204 is chosen as the center of the well drain. The predefined drain length is then a maximum half drain length between the drain center and drain ends, the drain ends being defined respectively as toe 205 and heel 206 of the well. The well 102, 103 is therefore represented as a broken line consisting of two segments, one between the toe 205 and the center 204, and one between the center 204 and the heel 206. It has to be noticed that in the specific example of the top-right part of FIG. 2a, the center 204, the toe 205 and the heel 206 are aligned, however this is not mandatory, as represented in bottom-right part of FIG. 2a.

Alternatively, the well insertion point 204 may be at one end of the well, the predefined drain length being a maximum full length of the well drain.

In another embodiment, the exact path of the well drain is defined from a first well insertion point 204, by determining other well insertion points 204 of a same well 102, 103.

Optionally, one or more well geometry constraints may be defined, such as a maximum curvature of the well 102, 103, a maximum depth of interval splitting algorithm, or another trajectory constraint feasibility function accepting as an input a set of trajectory points and returning a Boolean indicating whether the set of points represents a feasible trajectory.

Optionally, an additional constraint can be a maximum distance between well drains, if the additional drains belonging to a same well are provided.

In the following, it is assumed that a well is defined by a center 204 (or "insertion point"), a toe 205 and a heel 206. The person skilled in the art would easily apply the methods presented below to other possible representations.

Once one well insertion point 204, together with the toe 205 and the heel 206 of the well, have been positioned, other wells may be positioned similarly, as represented in bottom-right part of FIG. 2a.

Therefore, the positioning of the wells 102, 103 in the gridded model may be performed by recursively determining, for each well, an insertion point 204, a toe 205 and a heel 206.

FIG. 2b represents a set of constraints for positioning a well.

In a reservoir, the positions of the wells relative to each other must respect a set of constraints, or criteria, or "functional requirements", that must be taken into account when constructing the well pattern, and positioning a new well. This set of constraints define, in a discrete manner, whether a given cell is suitable or not for the positioning of a new well (or a new well part, e.g. a center/toe/heel).

Typically, the set of constraints may be divided into two subsets: constraints relative to flows, and constraints relative to a distance between the well to be positioned and an element of the gridded model (an element of the reservoir or a well already positioned).

For instance, the constraints relative to flows may comprise:
- Positioning wells toward locations presenting larger regional quantities of fluid available to flow; and
- Positioning wells toward locations presenting larger regional ability to flow.

The constraints relative to a distance between the well to be positioned and an element of the gridded model may comprise:
- Positioning wells "away" from undesired fluids for the considered type of well (injector/producer), i.e. maximizing a distance between the well and the groups of cells corresponding to undesired fluids;
- Positioning wells (or well parts) "away" from preexisting wells of same type, i.e. maximizing the distance between the well and the wells of same type already positioned;
- Positioning wells at an "ideal" distance from preexisting wells of different types, i.e. positioning a producer well at ideal distance from injector wells already positioned and/or positioning an injector well at ideal distance from producer wells already positioned. Conventionally, in the methods for constructing well patterns performed "by hand" by a reservoir engineer or a reservoir geologist, this ideal distance is determined by the engineer or the geologist based on his experience and his knowledge of the field. In the context of the present invention, this ideal distance may be predetermined, or determined automatically, as specified below.

An example of such constraints is provided with reference to FIG. 2b, where the reservoir comprises different geological zones 201, 202, 203, as in FIG. 2a. For instance, area 203 may represent the gas cap of the reservoir, area 202 may represent the oil leg and area 201 may represent the water leg. It is assumed that an injector well 102 and a producer well 103a have already been positioned in the gridded model, and that a new producer well 103b have to be positioned.

For positioning the well 103b, the following constraints may be taken into account:
- producer well 103b shall be positioned at an ideal distance from the existing injector well 102 (the distance between the producer well 103b and the existing injector well 102 being represented in full line in FIG. 2b);
- producer well 103b shall be far enough away from the water leg 201 and from the gas cap 203 (i.e. the distances between the producer well 103b and the water leg 201/gas cap 203, represented in broken lines, shall be maximized);
- producer well 103b shall be far enough away from the existing producer well 103a (i.e. the distance between the producer well 103b to be positioned and the existing producer well 103a, represented in dotted lines, shall be maximized).

Furthermore, the producer well 103b shall be positioned in a region 207 with high accumulation and permeability to respect flow constraints.

Through this example, it appears that the positioning of a new well is a problem of global optimization of several criteria. It also appears that it is necessary to define measures to quantify the relative ability of a cell to fulfill a given functional rule. More specifically, two types of measures may require a mathematical formulation:
- distance measures between cells (for computing distance between two wells/well parts, or between a well/well part and a geological feature such as water or gas regions); and
- flow measures, which represent the regional ability to flow or the quantity available to flow.

In one embodiment, a mathematical distance, such as the Euclidian distance or the Manhattan distance, may be used for measuring the distance between cells.

In another embodiment, the distance between cells may be calculated based on a diffusive time of flight (DTOF) from a first cell to another cell or to a group of cells (e.g. a group of cells having undesirable properties, such as water or gas region).

For instance, the DTOF may be computed using a Fast Marching Method (FMM) for structured grids, as described in the paper of J. Sethian, "A Fast Marching Level Set Method for Monotonically Advancing Fronts", Proc. Natl. Acad. Sci., pp. 1591-1595, 1996. Alternatively, the method of J. N. Tsitsiklis, "Efficient algorithms for globally optimal trajectories", Automatic Control, IEEE Transactions, pp. 1528-1538, 1995, may be applied using anisotropic slowness on any grid (including Corner Point Grids involving Non Neighbor Connection, NNC). However this method has a higher computational cost.

Of course, other distance measures may be used.

A flow measure for the quantity available to flow may be any function representing a regional average of a fluid property considering the ease with which flow can occur between the considered cell and cell(s) of its neighborhood.

A flow measure for the regional ability to flow may be determined based on a moving average of a fluid property (e.g. transmissibility) in cells of a neighborhood of the current cell.

In particular, the moving average may be a normalized exponential moving average in two- or three-dimensions. In a gridded model, a normalized exponential moving average is a filter that sums, along predefined directions (typically six [+I, −I, +J, −J, +K, −K] directions for a 3D-gridded model as shown in FIG. 3a), the result of an exponential moving average filter that applies weighting factors which decrease exponentially in the considered direction.

In a variant applicable to gridded models, a smaller subset of directions (e.g. the up, or down direction, particularly suitable in gravity drainage settings) can be used. On the contrary, adding diagonal directions basically launching rays going through series of corresponding cell edges, as shown in FIG. 3b, and/or launching rays along vertices directions, as shown in FIG. 3c, can be used.

More generally, the flow measure may be a function PA of a regional average of a 3D flow property $p(i, j, k)$. The flow property $p(i, j, k)$ may be a measure of either the cell scale quantity available to flow (e.g. accumulation or original oil-in-place—OOIP), or the ease of flow (e.g. the sum of well indexes of a well traversing cell in each direction +I, −I, +J, −J, +K, −K).

The flow measure PA may be expressed as follows:

$$PA(p(i, j, k)) = p(i, j, k) + \sum_{i=+I,-I,+J,-J,+K,-K} A_l(p(i, j, k))$$

with:

$$A_{+I}(p(i, j, k)) = \sum_{m=i+1}^{i_{max}} \alpha^{m-i} \cdot \left( \sum_{n=i}^{m-1} CDF^{-1}(T((n, j, k), (n+1, j, k))) \right) \cdot p(m, j, k)$$

and with $A_{-I}(i, j, k)$, $A_{+J}(p(i, j, k))$, $A_{-J}(i, j, k)$, $A_{+K}(p(i, j, k))$, and $A_{-K}(p(i, j, k))$ being defined similarly.

The function PA is a sum in some directions (typically, +I, −I, +J, −J, +K, −K) of the exponential moving average of the fluid property p(i, j, k) within an averaging window extending from the considered cell to the model boundary using a decreasing coefficient specific to each cell to cell connection. The decreasing coefficient may be proportional to the inverse Cumulative Density Function (CDF) of the transmissibility distribution T((n, j, k), (n+1, j, k)) of the geological model applied to the considered cell to cell transmissibility. The parameter a is the decrease between two cells separated by the highest transmissibility in the model (cumulative probability equal to 1); it constitutes the sole control parameter for the PA calculation.

Some variants of this flow measure (for instance, in case of a 2D-gridded model) or other flow measures may be used.

The ideal distance between the well to position and the preexisting wells of different types may be predetermined by a reservoir engineer or a reservoir geologist and used as an input of the process for positioning wells.

This ideal distance may also be determined based on preexisting wells, according to different schemes.

In one embodiment, the ideal distance may be determined so as to ensure a uniform distribution of the accumulation of a given fluid across the drainage areas defined by wells of a given type. For instance, the DTOF separation distance for wells of type A relative to type B may be defined as follows:

- For all cells of the gridded model, compute the diffusive time of flight $DTOF_B$ value to each of the preexisting wells of type B;
- For each preexisting well of type B, assign rank to cells in ascending order of the $DTOF_B$ values, starting from value 0;
- Cumulate the value of accumulation of the given fluid according to the determined rank;
- Define the ideal distance from A to B as the $DTOF_B$ value of the first cell (i.e. cell of the lowest rank) for which cumulated accumulation exceeds a threshold. For instance, this threshold may be equal to the total accumulation multiplied by the ratio between the current number of type A wells (i.e. the number of wells of type A already positioned+1) divided by the total number of type A wells (i.e. the number of wells of type A already defined+intended) multiplied by correction factor (e.g. a volume to distance ratio which may be derived from 2D or 3D regular tessellations commonly considered as ideal).

In another embodiment, the ideal distance may be determined by defining a separation distance in reference to the distance to a fluid contact. The DTOF separation distance may be the distance to producer wells such that the sum of produced fluid reservoir volume in place divided by the sum of porous reservoir volume falls below a certain threshold. The threshold may be determined considering the mean saturation versus height relation of the considered model.

The separation distance (e.g. $DTOF_I/DTOF_P$) may be defined differently depending on the considered type of well (I/P).

FIG. 4 represents a selection of cells for positioning a new well in a possible embodiment.

As mentioned above, the positioning of a new well may be performed under a set of constraints noted $C_1, \ldots C_n$. For instance, according to the example of constraints provided above, $C_1$ may be: "Positioning wells toward locations presenting larger regional quantities of fluid available to flow".

Each constraint (or "criterion") $C_1, \ldots C_n$ may be associated to a respective measure of adequacy to the criterion, referred to as "criterion measure" $D_1, \ldots D_n$, each criterion measure $D_i$ measuring a cell suitability relative to a respective criterion $C_i$.

Each criterion measure $D_i$ may correspond to a qualitative variable or a quantitative variable. For instance, if $C_3$ is "Positioning wells "away" from undesired fluids for the considered type of well", $D_3$ may be "suitable/non suitable" (e.g. by defining that a location is "suitable" if the distance between the cell and the considered undesired fluid is above a predefined threshold, and "unsuitable" if the distance is below the threshold), or $D_3$ may be the distance between the cell and the considered undesired fluid.

It is noted that the criteria may differ according to the type of wells considered, and according to the well parts considered.

By way of example and in a non-limiting manner, table 1 provided below presents some criterion measures that can be used, together with the type of well and the well part to which a criterion measure is applicable. Table 2 presents some criteria (constraints) that can be used, together with the type of well and the well part to which a criterion is applicable.

TABLE 1

Examples of criterion measures according to the well type and the well part

| Criterion measure | Well type | Well part |
|---|---|---|
| DTOF (Water leg) | Producer | Heel, Center, Toe |
| PA (OIP) | Producer | Heel, Center, Toe |
| PA (transmissivity) | Producer | Heel, Center, Toe |
| DTOF (producer parts) | Producer | Center |
| DTOF (center same well) | Producer | Heel, Toe |

TABLE 2

Examples of criteria according to the well type and the well part

| Criterion | Well type | Well part |
|---|---|---|
| Maximize a distance to the center of the well | Producer | Heel, Toe |
| Position the well part only in cells corresponding to a region in which the fluid is able to flow at significant rates under typical flow conditions | Producer | Heel, Center, Toe |

It can be seen that the positioning of new wells is a multicriteria optimization problem, or Pareto optimization problem, for which it may not be possible to isolate a unique solution that is better than the others for all criteria.

However, it is possible to keep some cells which are preferred to (which "dominate") other cells, by using a Non Dominated Sorting (NDS) algorithm.

For instance, let us consider the following situation, wherein four criteria are considered and four respective criteria measures are associated, in the case of five cells:

| | $C_1$ | $C_2$ | $C_3$ | $C_4$ | Worse than |
|---|---|---|---|---|---|
| Cell 1 | Suitable | Unsuitable | Unsuitable | Suitable | |
| Cell 2 | Unsuitable | Unsuitable | Suitable | Unsuitable | Cell 3 |
| Cell 3 | Unsuitable | Suitable | Suitable | Unsuitable | |
| Cell 4 | Unsuitable | Suitable | Unsuitable | Unsuitable | Cell 3 |
| Cell 5 | Suitable | Unsuitable | Unsuitable | Unsuitable | Cell 1 |

Cell 2 has same suitability for $C_1$, $C_3$, $C_4$ than cell 3. However, cell 3 is suitable for $C_2$ while cell 2 is not. Therefore, cell 2 is dominated by cell 3 and can be eliminated as a possible location of a new well. Similar reasoning can be done for cells 4 and 5. Finally, there are only two "favorable" locations for a new well: cell 1 and cell 3. In other words, cells 1 and 3 are on the Pareto frontier, and cells 2, 4, 5 are not.

FIG. 4 illustrates a selection process of cells for positioning a new well, in the case of two criteria and two respectively associated criterion measures $D_1$ and $D_2$. Of course, the process may be used for more than two constraint/criterion measures.

The left figure of FIG. 4 represents the Pareto frontier 401 (in grey), and the cells 402 on the Pareto frontier 401 (represented by circles with solid lines). It is noted that the axis of the graph may be defined such that the origin is defined by the two minimum criteria measures for cells located on the Pareto Frontier, even if this is not mandatory. The cells 403 under the Pareto frontier 401 (represented by dashed circles) are dominated cells, which are not Pareto optimal, and which are eliminated as possible locations for a new well.

In order to further reduce the cell domain in which positioning of a new well is possible, a second selection within the group of non-dominated cells 402 may be performed. For instance, it may be decided to keep only a number N of non-dominated cells 402.

This number N may typically correspond to the number of well parts that remain to be positioned, as it will be explained in reference to FIG. 5.

Each criterion measure $D_i$ is associated to a respective weight $w_i$ comprised between 0 and 1, such that the sum of the weights is equal to 1: $w_1 + \ldots + w_n = 1$. Therefore, it is possible to assign more importance to certain criterion measures than to others.

The second selection may then be performed by sampling N points in the hyper-quadrant 404 containing the non-dominated cells 402 according to the weights $\{w_1, w_2, \ldots w_n\}$ associated to the corresponding criterion measures $D_1$, $D_2, \ldots, D_n$ and to select the cells among the non-dominated cells 402 which are the "closest" to the sampled points, according to a predefined criterion. The sampling may be performed for instance by a Latin Hypercube sampling.

An example of this second selection scheme is represented in the center figure of FIG. 4, where N=4 points A, B, C, D are randomly sampled according to the weights $w_1$, $w_2$ of the criterion measures $D_1$ and $D_2$.

The "closest" non-dominated cell 402 may be the one which minimizes a mathematical distance (e.g. Euclidian distance) to the sampled point. Alternatively, the "closest" non-dominated cell 402 may be defined as follows:
consider the lines joining the origin of the graph and the sampled points A, B, C, D;
determine the intersection between these lines and the Pareto frontier;
for each sampled point A, B, C, D, select the non-dominated cell a, b, c, d which minimize a mathematical distance to the intersection of the respective line and the Pareto frontier.

This last scheme is illustrated in the right figure of FIG. 4, where the black circles 405 represent the non-selected non-dominated cells, and the white circles 406 represent the selected non-dominated cells, i.e. the cells corresponding to possible locations for positioning a new well part.

Other schemes may be used for the second selection. For instance, it is possible to select, for each sampled point A, B, C, D the non-dominated cell a, b, c, d such as the difference between the angle of the non-dominated cell a, b, c, d and the angle of the corresponding sampled point A, B, C, D, relative to an axis of the graph, is minimized. In other words, the selected non-dominated cell a, b, c, d is the closest cell on the Pareto frontier in the direction of the sampled point A, B, C, D.

Figure 5:
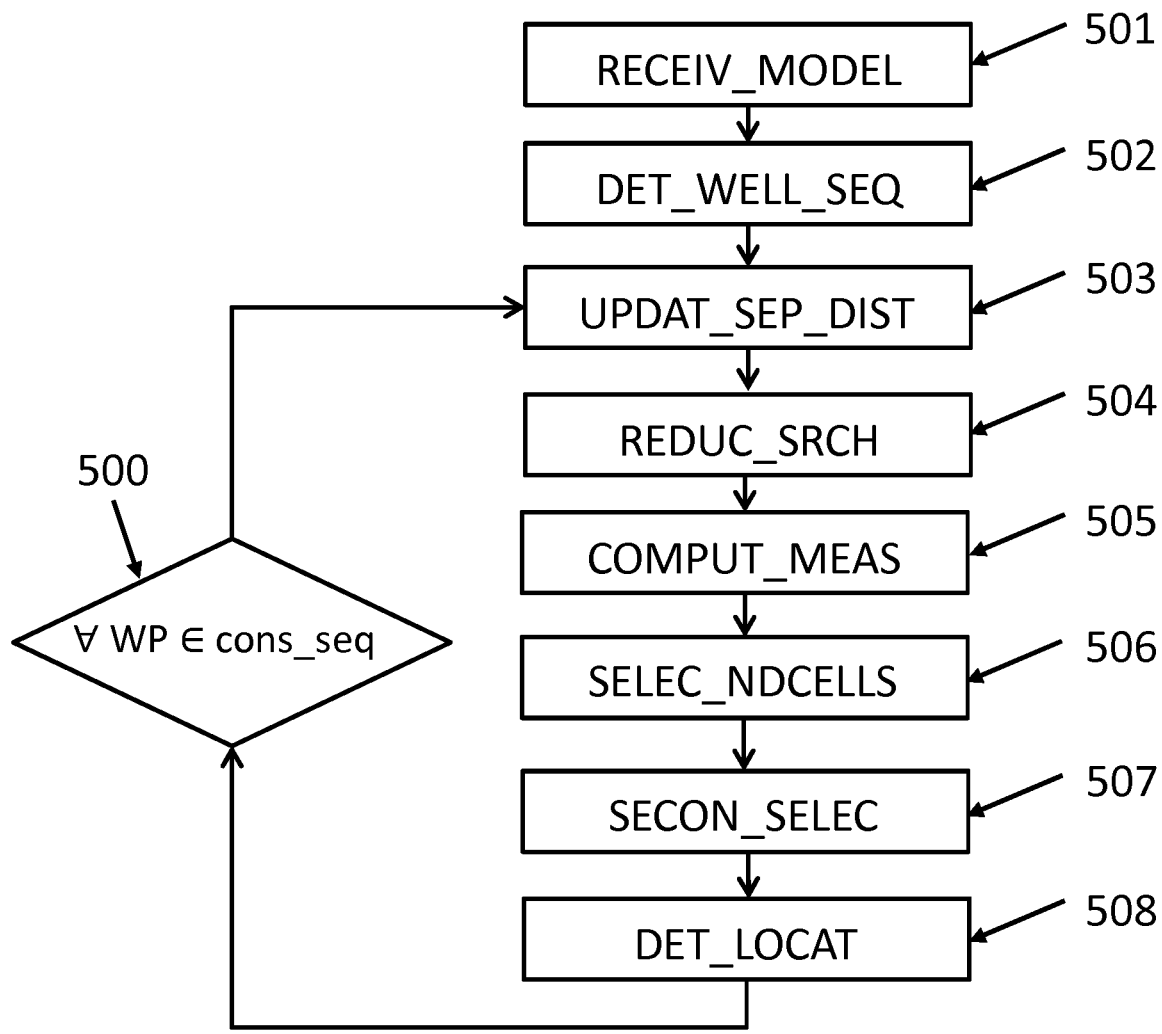
FIG. 5 is a flow chart describing the construction of a well pattern in a possible embodiment.

FIG. 5 is a flow chart describing the construction of a well pattern in a possible embodiment.

An input of the method of construction of a well pattern according to the present invention is a set of criterion measures $D_1, \ldots, D_n$, each criterion measure $D_i$ measuring a cell suitability relative to a respective constraint $C_i$.

As mentioned above, the criterion measures $D_1, \ldots D_n$ may be chosen, for instance, among: a distance measure between the well part to be positioned and an undesirable fluid, a distance measure between the well part to be positioned and a preexisting well part of same type, a distance measure between the well part to be positioned and a preexisting well part of a different type, and flow measures representing the regional ability to flow or the regional quantity available to flow. For instance, these distance measures may be based on the DTOF or the PA as described above.

Each criterion measure $D_i$ is associated to a respective weight $w_i$, to give more or less importance to certain constraints compared to others. The weights $w_i, \ldots, w_n$ are also an input of the method of construction of a well pattern.

Another input of the method may be a parameter relative to a number of wells to be positioned (e.g. the number of wells, a number of wells per unit of volume or area, etc.).

It is also possible to set as an input the desired ratio between different types of wells (e.g. the ratio P/I between the number P of producer wells and the number I of injector wells).

In addition, in some embodiments, it may be interesting that this ratio does not have the same value depending on the progress of the process—for example an important ratio at the beginning of the process, and a lower ratio at the end of the process, or vice versa. Therefore, it may be possible to set two desired values of the ratio: one is the value at the beginning, and the other one is the value at the end of the well pattern construction method. Alternatively, the function modeling the relation between the number of remaining wells to be positioned and the desired value of the ratio may be provided.

A possible embodiment of the method of construction of a well pattern is now provided, with reference to FIG. 5. It is assumed in the following that a well is defined by a center (element 204 of FIG. 2a), a toe (205) and a heel (206). It is also assumed that the number of wells desired for each type of well, the initial and the final ratios between the number P of producer wells and the number I of injector wells, are input data. Of course, the method may be adapted to other representations/input data.

A gridded model is received (step 501), and represents the properties of the reservoir contained in the field and comprising a plurality of adjacent cells.

At step 502, a sequence of well types (injector or producer) is determined, based on the number of wells to position per type of wells, or based on the number of wells to position and the desired ratio(s) between different types of wells.

For instance, let us assume that the input data comprise:
the number of wells to position per type of wells: $m_I$ and $m_P$, with $m_I + m_P = m$;

the initial ratio value $r_1$ and the end ratio value $r_m$ between the numbers of producer and injector wells;

In this case, the determination 502 may be performed as follows:

a/ Initialization: determine, by random draw, the first well type to be positioned;

b/ Determine the series $\{r_{ref}(1), \ldots, r_{ref}(m)\}$ of "reference" well type ratios, where $r_{ref}(i)$ is the desired ratio at step i;

c/ For each element of the sequence:

For each well type, compute the respective well type ratio assuming that the selected current well is of this type;

Select as the type of the current well the type corresponding to the computed well type ratio which is the closest to the current reference well type ratio.

For instance, in a/, the random draw may be performed according to probability distribution corresponding to the desired ratio between different types of wells: $[\Pr(I)=m_I/m; \Pr(P)=m_P/m]$.

In b/, a linear function between initial and end ratio values may be considered. In that case, the i-th element $r_{ref}(i)$ of the series is:

$$r_{ref}(i) = \frac{r_m - r_1}{m-1} i + \left(r_1 - \frac{r_m - r_1}{m-1}\right)$$

In c/, let us assume that $\eta_I$ wells of type I and $\eta_P$ wells of type P have been selected during previous iterations. Let us compute:

$$r_I(i) = \frac{\eta_P}{\eta_I + 1}; r_P(i) = \frac{\eta_P + 1}{\eta_I}$$

Then, let us choose the type (I or P) of well for which the distance from the ratio to the reference ratio ($|r_I(i)=r_{ref}(i)|$ or $|r_P(i)-r_{ref}(i)|$) is the weakest.

In case of a tie, the type of well may be chosen by random draw, or according to predefined rules. For instance, it may be decided that:

Producers are positioned before injectors; and/or

Wells are preferably positioned according to their preferred phases, in the following order: oil before gas before water.

The construction of the well pattern may then be performed based on the determined well type sequence, by performing, for each current well type WP of the well type sequence (500), steps 503 to 507 described hereinafter. For instance, a construction sequence for the well parts may be determined based on the determined well type sequence as follows: for each well type of the well type sequence, define corresponding well parts. For example, the determined well type sequence is $\{I, P, I, I\}$, the construction sequence may be $\{c^I, h^I, t^I, c^P, h^P, t^P, c^I, h^I, t^I, c^I, h^I, t^I\}$, where $c^I$ (resp. $c^P$) corresponds to the center of an injector (resp. producer) well, $h^I$ (resp. $h^P$) corresponds to the heel of an injector (resp. producer) well, and $t^I$ (resp. $t^P$) corresponds to the toe of an injector (resp. producer) well. It is noted that, for all wells, the well parts have to be positioned in the same order (e.g. first center, then heel, then toe), however the order may be different from above (e.g. first heel, then center, then toe).

At step 503, if the current well to be positioned is of a type different from the type of the well previously positioned, the separation distances may be updated to correspond to the separation distances applicable to the current type.

For each well part of the current well, the following steps may be performed:

Reduce (optional step 504) the search space to the intersection of search spaces defined by a set of rules applicable to the current well type considered. As mentioned above, depending on its type, a well shall be positioned with respect to the different areas (water, oil, ... ) according to a set of rules, that are fixed by the expert (and that are an input of the method).

In an illustrative and non-limiting way, said rules may be:

a) Positioning the well within a fluid region or within a set distance from a given region;

Example: positioning water injector in the water leg or within 500 m of said water leg region;

b) Positioning the well within a given distance from the well center;

Example: toe and heel within 500 m of the center to ensure that the drain will have maximum length of 1000 m;

c) Positioning the well outside of any cell penetrated by an exploration, appraisal or development well. This is typically the case if well to well collision is deemed an unmanageable risk and to be avoided during drilling;

d) Positioning the well within a region for which the development is authorized to occur from a contractual or legal standpoint;

e) In the case the well drain construction sequence is "center", then "heel", then "toe", in the region such that the radius of circle containing center, heel and potential toe location be of a radius of less than a given threshold value. This would be typical done to crudely represent drilling limitations;

Compute 505 the values of the criterion measures applicable to the well type considered over the reduced search space. The criterion measures may include flow measures (e.g. expressed as PA, as explained above) and distance measures (e.g. expressed as DTOF, as explained above);

Further reduce the search space by selecting 506 a group of cells in the gridded model as possible locations for the current well part. This selection 506 may be performed by computing the Pareto Frontier. In this case, the selected group of cells may correspond to the cells located on the Pareto frontier;

Performing a second selection at step 507 by sampling N points in the hyper-quadrant containing the non-dominated cells, as described with reference to the right figure of FIG. 4. The number N of sampled points may typically correspond to the number of well parts that remain to be positioned;

Determine 508 the location of the current well part, i.e. the cell of the gridded model in which the current well part has to be positioned. This location may be determined by choosing a unique cell based on the group of cells selected at the end of step 507. This cell may be for instance the cell which is the closest (according to a proximity criterion) to its respective line among the selected cells (in the example of FIG. 4, the proximity criterion being a Euclidean distance, this unique cell corresponds to point d).

In one or several embodiments, at step 501, a plurality of realizations of the gridded model may be received. In these embodiments, the iterative method 503-508 for determining the location of a well part may be applied in parallel on each model realization. Hence, a set of locations are determined according to 503-508, each location being respectively associated to a realization among the plurality of realizations of the gridded model. An additional step may be further performed for determining a single point based on the determined set of locations. This single point may be then chosen as the location of the current well part.

For instance, the single point may be chosen as being, among the set of cells determined at step 508 (said set of cells comprising one unique cell per realization), the cell which is the closest (according to a proximity criterion) to its respective line.

In another embodiment, it is possible to determine a barycenter of the set of cells determined at step 508 (said set of cells comprising one unique cell per realization) and to choose the cell, among said set of cells, which is the closest to the barycenter.

In yet another embodiment, the single point may correspond to the cell, among the set of cells determined at step 508 (said set of cells comprising one unique cell per realization), having the highest regional density for smallest averaging cell window. For instance, this may be performed as follows:

Select a first size for a cell window (e.g. a size equal to 1, which corresponds to a mesh of the gridded model), and choose, among the set of cells determined at step 508, the cell(s) having the highest density;

If there is more than one cell with the largest density, select a second size for a cell window, said second size being larger than the first size (e.g. a size equal to 3, i.e. a mesh and its direct neighbors). Choose, among the previous chosen cells, the cell having the highest average density on the window considered;

Repeat the process until only one cell remains.

Other scheme may be used for determining the single point.

The method described above with reference to FIG. 5 makes it possible to automatically determine a well pattern, depending on the geology, according to an artificial intelligence approach based on optimality rules that are, in practice, the rules used by the reservoir geologist/engineer who establishes such patterns "by hand". It allows a very strong reduction of the search space, which remains nevertheless large.

This method requires receiving, as input, a set of parameters, including the weights associated with the constraints used for determining the well pattern. It models the knowledge of the operator (reservoir engineer/geologist) for positioning wells, but this user still has to set the values of these parameters in relation with the specific knowledge of the problem (local knowledge).

These parameters define the axis of the space to be explored for positioning the well parts, as represented for instance in FIG. 4. However, even if the operator may have an intuitive understanding of the axes, it is complicated for him to quantify these axes. Therefore, the effectiveness of the method described above is reduced, because in practice the operator has to test different values of the weights and judge their relevance as a function of the result returned by the method.

There is thus a need for a method that does not require the knowledge of the weights associated with the constraints for constructing a well pattern. The method described below proposes for this purpose to automatically build well patterns from:

one or several reference well pattern(s), generated by an expert (reservoir engineer or geologist); and a description of the constraints and the criterion measures used by the expert for generating said reference well pattern(s). The weights associated with the constraints are not a part of this description and are not known.

The purpose of the method is to estimate the weights underlying the generation of the reference well pattern(s) in order to provide well patterns "close" to the reference model(s), i.e. built according to a similar logic. By "underlying", it is meant that the weights are not positively set by the expert to generate the reference model, but they mathematically translate an intuitive knowledge of the expert on the studied geological structure.

Once these weights are estimated from reference fields, it is then possible to apply the pattern determination method described above to similar fields in terms of geology, and to obtain new patterns completely automatically.

Figure 6:
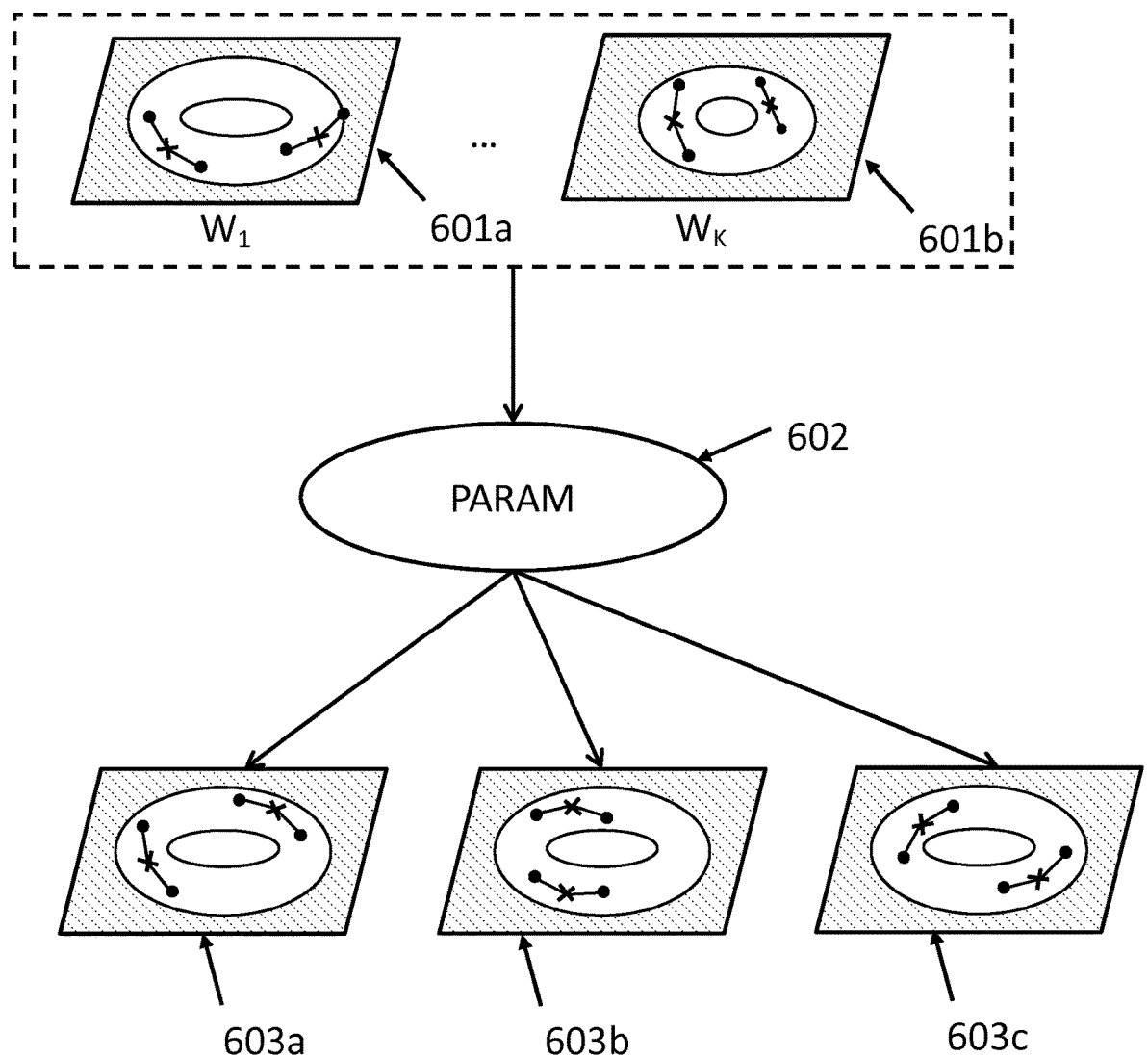
FIG. 6 represents an estimation of parameters based on reference well patterns in a possible embodiment of the invention

FIG. 6 represents an estimation of parameters based on reference well patterns in a possible embodiment of the invention.

The method for estimating the parameters of the parametrized construction method may receive, in input:

One or several couples of:
Model realization(s) $M_1, \ldots, M_K$ (each realization including a gridded model as defined above);
Reference well pattern(s) $W_1, \ldots, W_K$ (elements 601a, 601b of FIG. 6), each well pattern $W_i$ being respectively associated to a model realization $M_i$, including, for each well of a subset of positioned wells (or for each positioned well):
Locations (i.e. coordinates of corresponding cells) of heel, center and toe of the well;
The well type: producer/injector;
It is noted that there can be several reference well patterns for a same realization—in other words, some model realizations among the group of model realizations $M_1, \ldots, M_K$ may be the same;
Descriptive information regarding how the well patterns have been determined, including the set of criteria and the set of respective criterion measures that have been considered for designing the well pattern(s).

The input data may comprise other information, for instance the preferred phase of the well (water/oil/gas), the values of the ratio between different types of wells (e.g. P/I), or the initial ratio value $r_1$ and the end ratio value $r_m$, or the function modeling the ratio value according to the iteration number, or any other information relative to said ratio.

It is noted that the weights $w_i$ associated to the criterion measures are not an input of the estimation method, since they are an output of the method.

The set 602 of weights associated to the criterion measures of the well pattern construction method are estimated based on the input data. New patterns 603a, 603b, 603c may then be determined by using the method for constructing of a well pattern represented in FIG. 5.

Typically, the reference well pattern(s) 601a, 601b are constructed by an expert. In some embodiments, the reference well pattern(s) may be "uncomplete" pattern(s), in the sense that the expert does not need to construct the whole pattern, but only a part of it. An uncomplete pattern may be used for estimating the parameters, and one of the parameters are estimated, the pattern part may be "completed" by using the above construction method for determining supplementary well positions.

Figure 7:
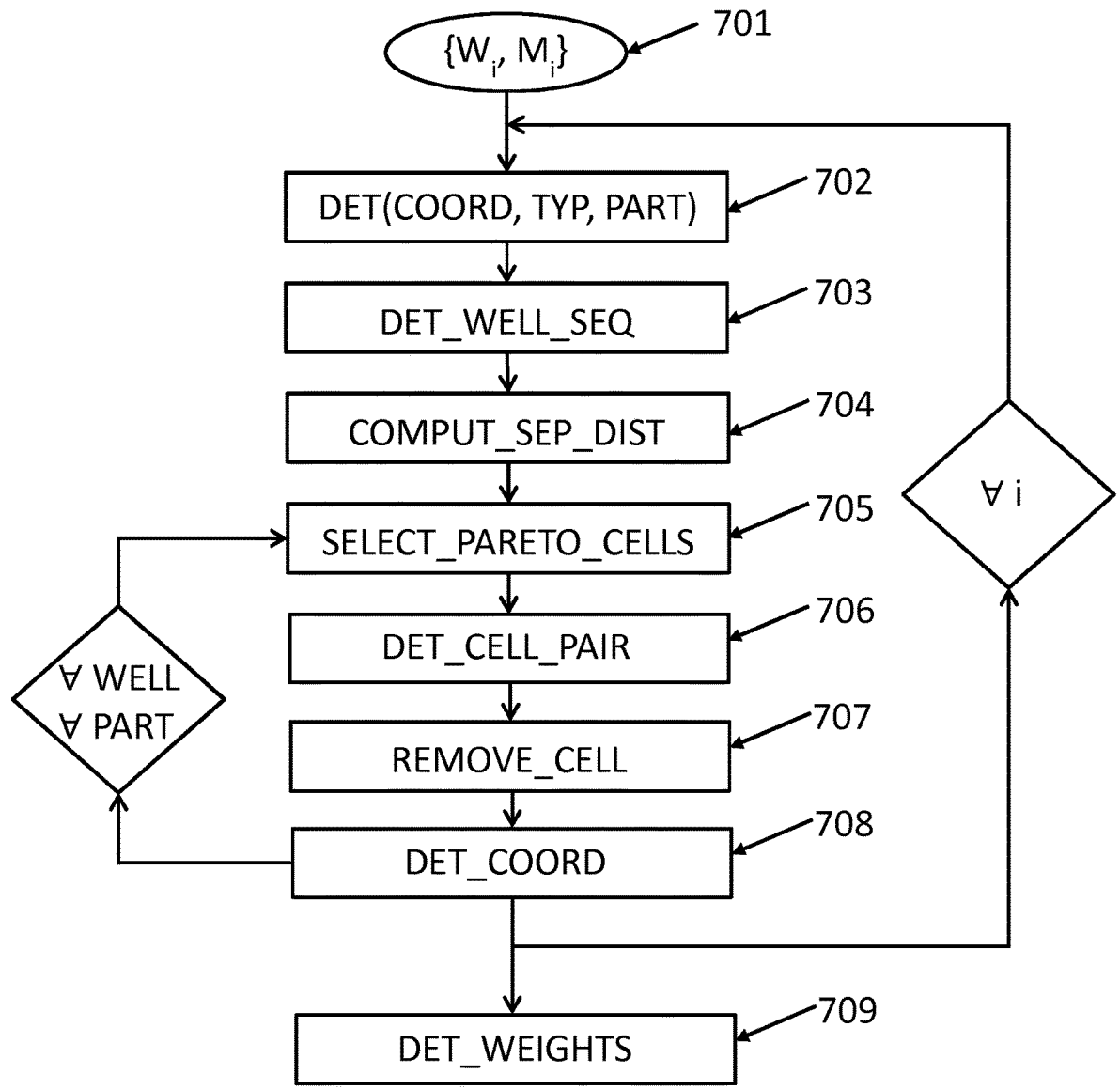
FIG. 7 is a flowchart describing the estimation of parameters in a possible embodiment.

FIG. 7 is a flowchart describing the estimation of parameters in a possible embodiment.

At step 701, a set of pairs $\{W_i, M_i\}$ is received, each pair being composed of a reference well pattern $W_1$ and its associated model realization $M_i$.

Figure 8:
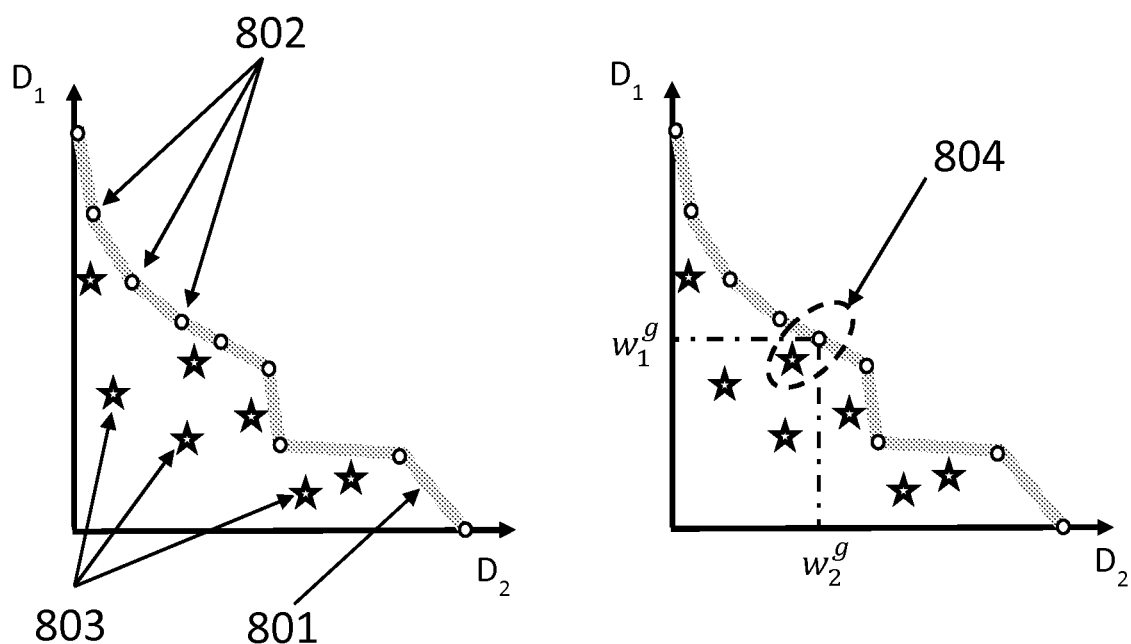
FIG. 8 represents a determination of the weights for a current well part, in a possible embodiment.

Then, for each pair $\{W_i, M_i\}$:
Determine 702 the set of all well parts of the reference pattern $W_i$, hereinafter referred to as "set of available well parts". Each available well part may typically be characterized by a position (i.e. coordinates in the gridded model), a well type (injector/producer) and part type (e.g.: heel, center, and toe);
Determine 703 a sequence of well types as in step 502 of FIG. 5, based on the number of wells positioned in the reference well pattern $W_i$ and the information relative to the ratio between the different types of wells;
Compute 704 the separation distances applicable to each couple of well types as in step 503 of FIG. 5;
For each well part among the sequence of well types determined at step 703, perform the following steps:
Determine 705 the group of cells belonging to the Pareto Frontier based on the input criterion measures, similarly to steps 504-506 of FIG. 5;
Determine 706, among the set of available well parts, the pair of cells composed of:
The available well part which is the closest to a cell among the group of cells belonging to the Pareto Frontier determined at step 705; and
The corresponding cell of the Pareto Frontier (i.e. the cell of the Pareto Frontier which is the closest to the selected available well part).
For instance, this determination 706 may be performed by minimizing a Hausdorff distance between the set of available well parts and the group of cells belonging to the Pareto Frontier and selecting the pair of cells {available well part; cell belonging to Pareto Frontier} that minimizes this distance.
Remove 707 the selected available well part from the set of available well parts;
Determine 708 the weights of the criterion measures: these weights correspond to the coordinates of the cell belonging to the Pareto Frontier determined at step 706 on the axis corresponding to respective criterion measures;
It is noted that the above steps may be performed only for well parts corresponding to "centers". Once the cell of the Pareto frontier has been determined for the center, it is possible to choose the points corresponding to the toes and heels only among the cells closest to the determined "center" cell.
Once steps 705-708 have been performed for each well of the well sequence and for each reference well pattern $W_1$, we have a set of values $\{w_i^{k,j}, k \in \{1, \ldots, K\}, j \in \{1, \ldots, J\}\}_{i \in \{1, \ldots, n\}}$ for each weight $w_i$ (J being the size of the well sequence and K the number of reference well patterns). Each weight $w_1$ may then be estimated 709 as a function of the corresponding set of values $\{w_i^{k,j}\}_{k \in \{1, \ldots, K\}, j \in \{1, \ldots, J\}}$. For instance, the estimate of the weight $w_i$, for a given type of well and a given type of part, may be a mean of the determined values $w_i^{k,j}$ for said type of well and for said type of part.
In another embodiment, it is possible to sort, for each reference pattern $W_i$, the weights identified by increasing distance to the Pareto Frontier, and to average only the Y first weights, Y being an integer (input of the method).
Other functions may be used.
FIG. 8 represents a determination of the weights for a current well part, in a possible embodiment.
FIG. 8 represents a determination of the weights as performed in steps 705-708 of FIG. 7.
In the left figure, the cells 802 of the Pareto Frontier 801 are represented, together with the remaining available cells 803. The pair 804 of cells comprising the cell among the available cells 803 and the cell among the cells 802 of the Pareto Frontier having the lowest distance is selected. The coordinates of the cell of the Pareto Frontier belonging to the selected pair 804 correspond to the values of the weights $w_1^g$, $w_2^g$ of the respective criteria $D_1$, $D_2$.

The estimated weights can then be used as input of the method for constructing well patterns, overcoming the above-mentioned problems related to the definition of these parameters by the operator.

In other words, a possible method for automatically constructing well patterns may comprise the following steps:
Receive a set of well patterns corresponding to respective gridded models (e.g. constructed by hand by an operator);
Determine, with the estimation method described in FIG. 7, a set of parameters; and
Determine a well pattern by using the construction method described in FIG. 5 with the set of parameters previously estimated.

Figure 9:
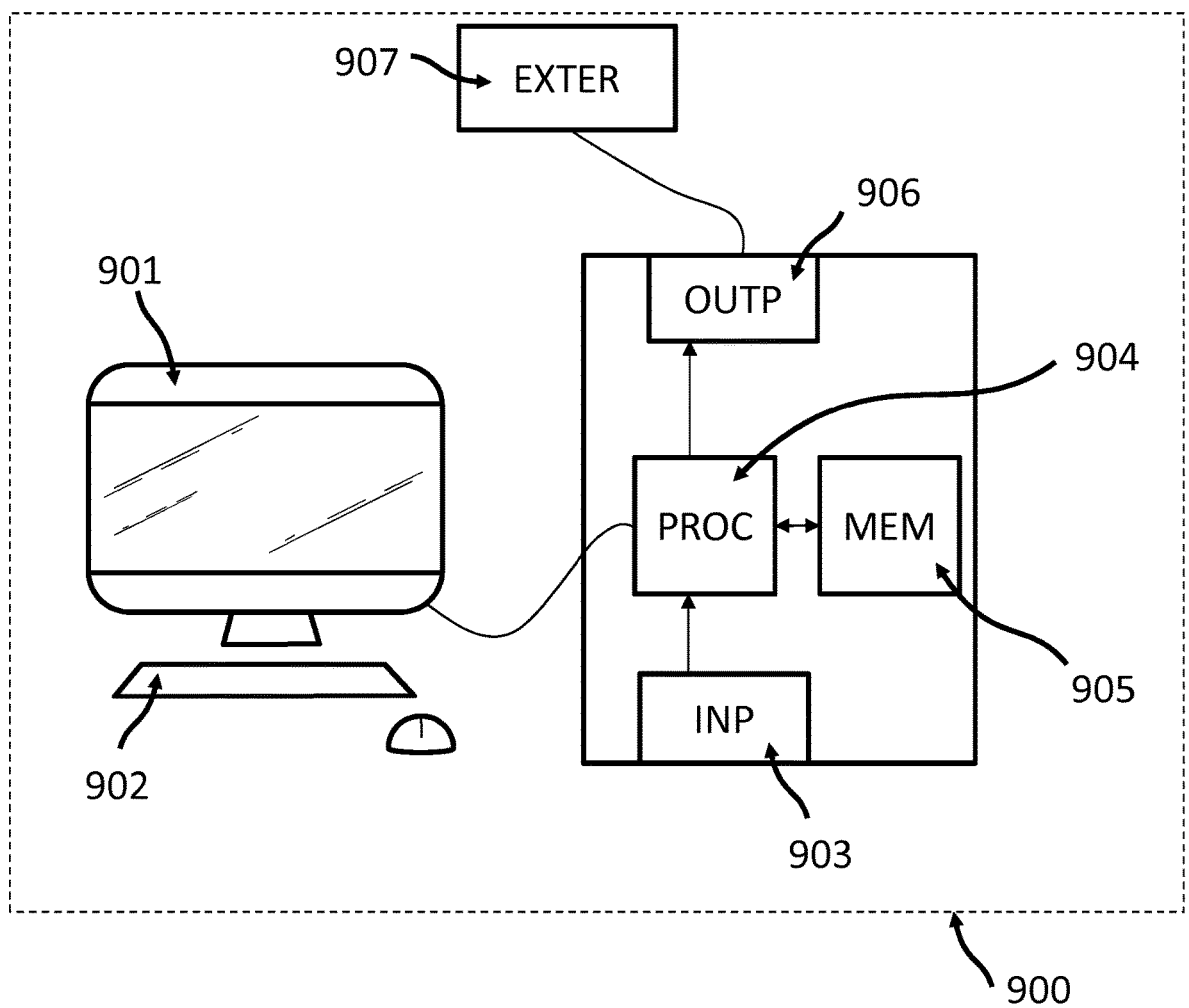
FIG. 9 is a possible embodiment for a device that enables the present invention.

FIG. 9 is a possible embodiment for a device that enables the present invention

In this embodiment, the device 900 comprise a computer, this computer comprising a memory 905 to store program instructions loadable into a circuit and adapted to cause circuit 904 to carry out the steps of the present invention when the program instructions are run by the circuit 904.

The memory 905 may also store data and useful information for carrying the steps of the present invention as described above.

The circuit 904 may be for instance:
a processor or a processing unit adapted to interpret instructions in a computer language, the processor or the processing unit may comprise, may be associated with or be attached to a memory comprising the instructions, or
the association of a processor/processing unit and a memory, the processor or the processing unit adapted to interpret instructions in a computer language, the memory comprising said instructions, or
an electronic card wherein the steps of the invention are described within silicon, or
a programmable electronic chip such as a FPGA chip (for «Field-Programmable Gate Array»).

This computer comprises an input interface 903 for the reception of input data used for the estimation method according to the invention and an output interface 906 for providing a set of estimated parameters. These parameters may then be used as input data 907 of the method for constructing well patterns detailed with reference to FIG. 5.

To ease the interaction with the computer, a screen 901 and a keyboard 902 may be provided and connected to the computer circuit 904.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A computer-implemented method for determining locations of wells in a field with subsoil containing a hydrocarbon reservoir, the method comprising:
/a/ receiving a plurality of geological gridded models, each gridded model among the plurality of geological gridded models including a respective plurality of cells;
/b/ receiving a set of criteria for positioning wells in a geological gridded model;
/c/ receiving a plurality of reference well patterns, each reference well pattern among the plurality of reference well patterns including a respective plurality of reference locations of wells in a respective geological gridded model among the plurality of geological gridded models;
/d/ for each geological gridded model among the plurality of geological gridded models:
/d1/ for a number of iterations equal to a number of wells in the reference well pattern respectively associated to the geological gridded model:
determining a group of cells among the respective plurality of cells of said geological gridded model;
for each cell among said group of cells, computing criterion measures, each criterion measure representing a suitability to a respective criterion among the received set of criteria;
determining, based on said criterion measures, a set of non-dominated cells among said group of cells via a non-dominated sorting algorithm for jointly optimizing the set of criteria;
determining a first cell among the set of non-dominated cells, said first cell minimizing a distance between the plurality of reference locations of the reference well pattern respectively associated to the geological gridded model and the set of non-dominated cells; and
determining a plurality of intermediate weights based on coordinates of the first cell in a space defined by the set of criterion measures, each intermediate weight being associated to a respective criterion among the set of criteria;
/e/ estimating a plurality of weights, each weight being associated to a respective criterion among the set of criteria and estimated based on intermediate weights among the plurality of intermediate weights associated to said respective criterion;
/f/ receiving a second geological gridded model of the field, said second geological gridded model including a respective plurality of cells;
/g/ determining locations of wells in the second geological gridded model based on the received set of criteria and the plurality of estimated weights; and
/h/ based on the determined locations, injecting one or more fluids into the subsoil or producing fluids from the field in the subsoil.

2. The method of claim 1, wherein /d/ comprises:
determining a plurality of intermediate weights $w_i^{k,j}$ corresponding to a weight $w_i$ associated to a criterion $C_i$ among the set of criteria, k being an integer between 1 and a number of reference well patterns and j being an integer between 1 and the number of wells in the reference well pattern respectively associated to the geological gridded model, and
wherein /e/ comprises:
estimating the weight $w_i$ as a function of intermediate weights $w_i^{k,j}$ among the plurality of intermediate weights.

3. The method of claim 1, wherein, in /d1/, the determining of the group of cells comprises:
receiving a first set of location constraints depending on a type of well,
wherein said group of cells includes cells that satisfy said first set of location constraints.

4. The method of claim 1, wherein the determining /g/ of the locations of wells in the second geological gridded model comprises:
/g1/ for a number of iterations equal to a number of wells to be positioned in the second geological gridded model:
determining a second group of cells among the respective plurality of cells of said second geological gridded model;
for each cell among said second group of cells, computing criterion measures, each criterion measure representing a suitability to a respective criterion among the received set of criteria;
determining, based on said criterion measures, a second set of non-dominated cells among said group of cells via a non-dominated sorting algorithm for jointly optimizing the set of criteria; and
determining a location for said well, based on said second set of non-dominated cells and on the plurality of weights estimated.

5. The method of claim 4, wherein, in /g1/, the determining of the second group of cells comprises:
receiving a second set of location constraints depending on a type of well, wherein said second group of cells includes cells that satisfy said second set of location constraints.

6. The method of claim 4, wherein, in /g1/, the determining of the location for said well comprises:
determining N points in the space defined by the set of criterion measures, wherein N is an integer, via a random sampling from a multidimensional distribution of the plurality of weights estimated;
determining, among the second set of non-dominated cells, a cell which minimizes a predefined proximity criterion to the N points determined; and
selecting said cell as being the location for said well.

7. The method of claim 1, wherein the criterion measures include at least one distance measure among:
a distance to another cell or group of cells having at least an undesired property;
a distance to another cell or group of cells corresponding to a well or a well of a same type that the well being positioned; and
a distance to another cell or group of cells corresponding to a well or a well of a different type that the well being positioned.

8. The method of claim 1, wherein the criterion measures include at least one flow measure among:
a regional quantity of fluid available to flow; and
a regional ability for a given fluid to flow.

9. A non-transitory computer readable storage medium, having stored thereon a computer program comprising program instructions, the computer program being loadable into a data-processing device and configured to cause the data-processing device to carry out the method of claim 1 when the computer program is run by the data-processing device.

10. A device for determining locations of wells in a field with subsoil containing a hydrocarbon reservoir, the device comprising a processor configured for:

/a/ receiving a plurality of geological gridded models, each gridded model among the plurality of geological gridded models including a respective plurality of cells;

/b/ receiving a set of criteria for positioning wells in a geological gridded model;

/c/ receiving a plurality of reference well patterns, each reference well pattern among the plurality of reference well patterns including a respective plurality of reference locations of wells in a respective geological gridded model among the plurality of geological gridded models;

/d/ for each geological gridded model among the plurality of geological gridded models:

/d1/ for a number of iterations equal to a number of wells in the reference well pattern respectively associated to the geological gridded model:

determining a group of cells among the respective plurality of cells of said geological gridded model;

for each cell among said group of cells, computing criterion measures, each criterion measure representing a suitability to a respective criterion among the received set of criteria;

determining, based on said criterion measures, a set of non-dominated cells among said group of cells via a non-dominated sorting algorithm for jointly optimizing the set of criteria;

determining a first cell among the set of non-dominated cells, said first cell minimizing a distance between the plurality of reference locations of the reference well pattern respectively associated to the geological gridded model and the set of non-dominated cells; and determining a plurality of intermediate weights based on coordinates of the first cell in a space defined by the set of criterion measures, each intermediate weight being associated to a respective criterion among the set of criteria;

/e/ estimating a plurality of weights, each weight being associated to a respective criterion among the set of criteria and estimated based on intermediate weights among the plurality of intermediate weights associated to said respective criterion;

/f/ receiving a second geological gridded model of the field, said second geological gridded model including a respective plurality of cells;

/g/ determining locations of wells in the second geological gridded model based on the received set of criteria and the plurality of estimated weights; and /h/ based on the determined locations, injecting one or more fluids into the subsoil or producing fluids from the field in the subsoil.

\* \* \* \* \*